(12) United States Patent
Tripathi et al.

(10) Patent No.: US 10,592,124 B2
(45) Date of Patent: Mar. 17, 2020

(54) PREDICTABLE CLIENT LATENCY VIA BACKGROUND FILE SYSTEM OPERATIONS

(71) Applicant: Intelliflash by DDN, Inc., Santa Clara, CA (US)

(72) Inventors: Shailendra Tripathi, Fremont, CA (US); Enyew Tan, Newark, CA (US)

(73) Assignee: INTELLIFLASH BY DDN, INC., Santa Clara, CA (US)

(*) Notice: Subject to any disclaimer, the term of this patent is extended or adjusted under 35 U.S.C. 154(b) by 59 days.

(21) Appl. No.: 15/697,152

(22) Filed: Sep. 6, 2017

(65) Prior Publication Data

US 2019/0056871 A1 Feb. 21, 2019

Related U.S. Application Data

(60) Provisional application No. 62/546,080, filed on Aug. 16, 2017.

(51) Int. Cl.
*G06F 12/00* (2006.01)
*G06F 13/00* (2006.01)
*G06F 3/06* (2006.01)
*G06F 12/02* (2006.01)

(52) U.S. Cl.
CPC .......... *G06F 3/0613* (2013.01); *G06F 3/0619* (2013.01); *G06F 3/0659* (2013.01); *G06F 3/0667* (2013.01); *G06F 3/0688* (2013.01); *G06F 3/0689* (2013.01); *G06F 12/02* (2013.01); *G06F 3/067* (2013.01)

(58) Field of Classification Search
None
See application file for complete search history.

(56) References Cited

U.S. PATENT DOCUMENTS

7,386,663 B2 6/2008 Cousins
7,536,693 B1 5/2009 Manczak

*Primary Examiner* — Sean D Rossiter
(74) *Attorney, Agent, or Firm* — David R. Stevens; Stevens Law Group (57) ABSTRACT

A method, system and computer program product for managing an amount of storage written from a transaction group comprises creating a plurality of transaction classes within each of a plurality of write transaction classes and discovering an initial underlying drive capability assignable to the transaction classes when a storage pool is allocated (SPA). Each transaction class capability weight is adjusted via computing an instruction and operations per second, a data rate per second and a time slice at every storage pool allocator sync time. An unspent time slice from an adjusted transaction class is lent to a plurality of remaining transaction classes yet to be adjusted via a staged processing distribution during sync of the SPA. The disclosed method further includes assigning system resources and underlying drive capability to each transaction class per its capability weight based on a ratio of weights for each transaction class of operations.

19 Claims, 6 Drawing Sheets

PREDICTABLE CLIENT LATENCY VIA BACKGROUND FILE SYSTEM OPERATIONS

CROSS-REFERENCE TO RELATED APPLICATION

This application claims the benefit of the priority date of earlier filed U.S. Provisional Patent Application Ser. No. 62/546,080, titled 'Predictable Client Latency Via Background File System Operations' filed Aug. 16, 2017, and is incorporated herein by reference in its entirety.

BACKGROUND OF THE INVENTION

The ZetaByte File System (ZFS) uses a logging mechanism, the ZFS intent log (ZIL) to store synchronous writes, until they're safely written to the main data structure in the memory storage pool. The speed at which data can be written to the ZIL determines the speed at which synchronous write requests can be serviced: the faster the ZIL, the faster most databases, NFS and other important write operations become. Normally, the ZIL is part of the regular memory pool on storage disk. But ZFS offers the possibility to use a dedicated device for the ZIL. This is then called a "log device".

ZFS also has a sophisticated cache called the "Adaptive Replacement Cache" (ARC) where it stores both most frequently used blocks of data and most recently used ones. The ARC is stored in RAM, so each block of data that is found in the RAM can be delivered quickly to the application, instead of having to fetch it again from disk. When RAM is full, data needs to be thrown out of the cache and is not available any more to accelerate reads.

Solid-state arrays (SSA) have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and filesystem responsibilities. Simultaneously, the network filesystem protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

SUMMARY OF THE INVENTION

A method for managing an amount of storage written from a transaction group comprises creating a plurality of transaction classes within each of a plurality of write transaction groups and discovering an initial underlying drive capability assignable to the transaction classes when a storage pool is allocated (SPA). The disclosed method also includes adjusting each transaction class capability weight via computing an instruction operations per second (IOPS) and a data rate per second (MBPS) and a time slice at every storage pool allocator sync time. The disclosed method additionally includes lending an unspent time slice from an adjusted transaction class to a plurality of remaining transaction classes yet to be adjusted via a staged processing distribution during sync of the SPA. The disclosed method further includes assigning (time) system resources, more specifically underlying drive capability to each transaction class per its capability weight based on a ratio of weights for each transaction class of operations.

A system for managing an amount of storage written from a transaction group, the method comprising a module configured to create a plurality of transaction classes within each of a plurality of write transaction groups and configured to discover an initial underlying drive capability assignable to the transaction classes when a storage pool is allocated (SPA). The disclosed system also includes a module configured to adjust each transaction class capability weight via computing an instruction operations per second (IOPS) and a data rate per second (MBPS) and a time slice at every storage pool allocator sync time. The disclosed system additionally includes a module configured to lend an unspent time slice from an adjusted transaction class to a plurality of remaining transaction classes yet to be adjusted via a staged processing distribution during sync of the SPA. The disclosed system further includes a module configured to assign (time) system resources, more specifically underlying drive capability to each transaction class per its capability weight based on a ratio of weights for each transaction class of operations. The system for managing an amount of storage from a transaction group of claim 1, further yet includes a module configured to predict a client latency via a plurality of background file system operations.

A non-transitory processor-readable storage medium is disclosed having one or more instructions which when executed by at least one processing circuit causes the at least one processing circuit to manage an amount of storage written from a transaction group, the instruction which when executed by at least one processor causes the processor to create a plurality of transaction classes within each of a plurality of write transaction groups and discovering an initial underlying drive capability assignable to the transaction classes when a storage pool is allocated (SPA). The instruction executed by the at least one processor causes the processor to adjust each transaction class capability weight via computing an instruction operations per second (IOPS) and a data rate per second (MBPS) and a time slice at every storage pool allocator sync time. The instruction also causes the processor to lend an unspent time slice from an adjusted transaction class to a plurality of remaining transaction classes yet to be adjusted via a staged processing distribution during sync of the SPA. Furthermore, the instruction causes the processor to assign processor system resources, more specifically underlying drive capability to each transaction class per its capability weight based on a ratio of weights for each transaction class of operations.

Other aspects and advantages of embodiments of the disclosure will become apparent from the following detailed description, taken in conjunction with the accompanying drawings, illustrated by way of example of the principles of the disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'dirty data' refers to inaccurate, incomplete, outdated, duplicated or erroneous data. The term 'persistent data' refers to data which preserves the previous version of itself when modified, ie a new updated structure is produced without updating the structure in place. The term 'sync' is an abbreviated form of the term 'synchronization.' Similarly the term, "async" is an abbreviated form of the term 'asynchronization.' Since storage pool allocator (SPA) is commonly referred to in the acronym form, a spa_sync is therefore a synchronization of the storage pool allocator. The acronym RAID is defined as a redundant array of independent disks and is a data storage virtualization technology that combines multiple physical disk drive components into a single logical unit for the purposes of data redundancy, performance improvement, or both. The term 'weight' is a value based on a transaction class compute capability, throughput including instructions and data and a time slice allotted thereto. A time slice is a period of time allocated for processing a transaction.

The transactions in a transaction group representing one spa sync cycle, track all the dirty buffers during transactions. Once the dirty buffer reaches a given threshold of 60% of the total allowed dirty data (4 GB of total dirty data system wide), it starts throttling the transactions. The delay grows exponentially as it nears the dirty limit. In worst case, it forces the transactions to wait for the spa syncs to finish before new ingest is allowed. Each spa syncs the dirty data to drives, and, hence, the latency of the ingest also gets bounded by the spa_sync time. If the spa sync time goes very high, it is immediately visible to the client.

Distinctive mechanisms of the disclosure include the following. 1) There is no system wide limit for dirty data shared among the all the pools on the system. 2) The dirty data model spreads the dirty data evenly among the transaction group. This avoids a see-saw pattern in write cycles where one transaction group accumulates lot of data whereas the other gets very little data. 3) Finish semantics of the transaction group enables a small burst of data to exceed limits and avoids closing all 3 transaction groups with very little data forcing new transactions to wait for spa sync to finish. 4) The mechanism does not treat every operation as equal. Hence, even a small sized 1K byte operation avoids the same wait mechanism as large I/O requests. 5) The mechanism does not block log commit (log allocations) operations. Hence, the latency is not impacted when all transactions groups are closed for syncing. 6) The mechanism differentiates between background operations and latency path operations. Hence, background operations do not impact the latency very badly depending upon the extent of the background operations. 7) The dirty data limit is not a fixed threshold depending on the underlying capabilities of the system.

Data Write Architecture

Figure 1:
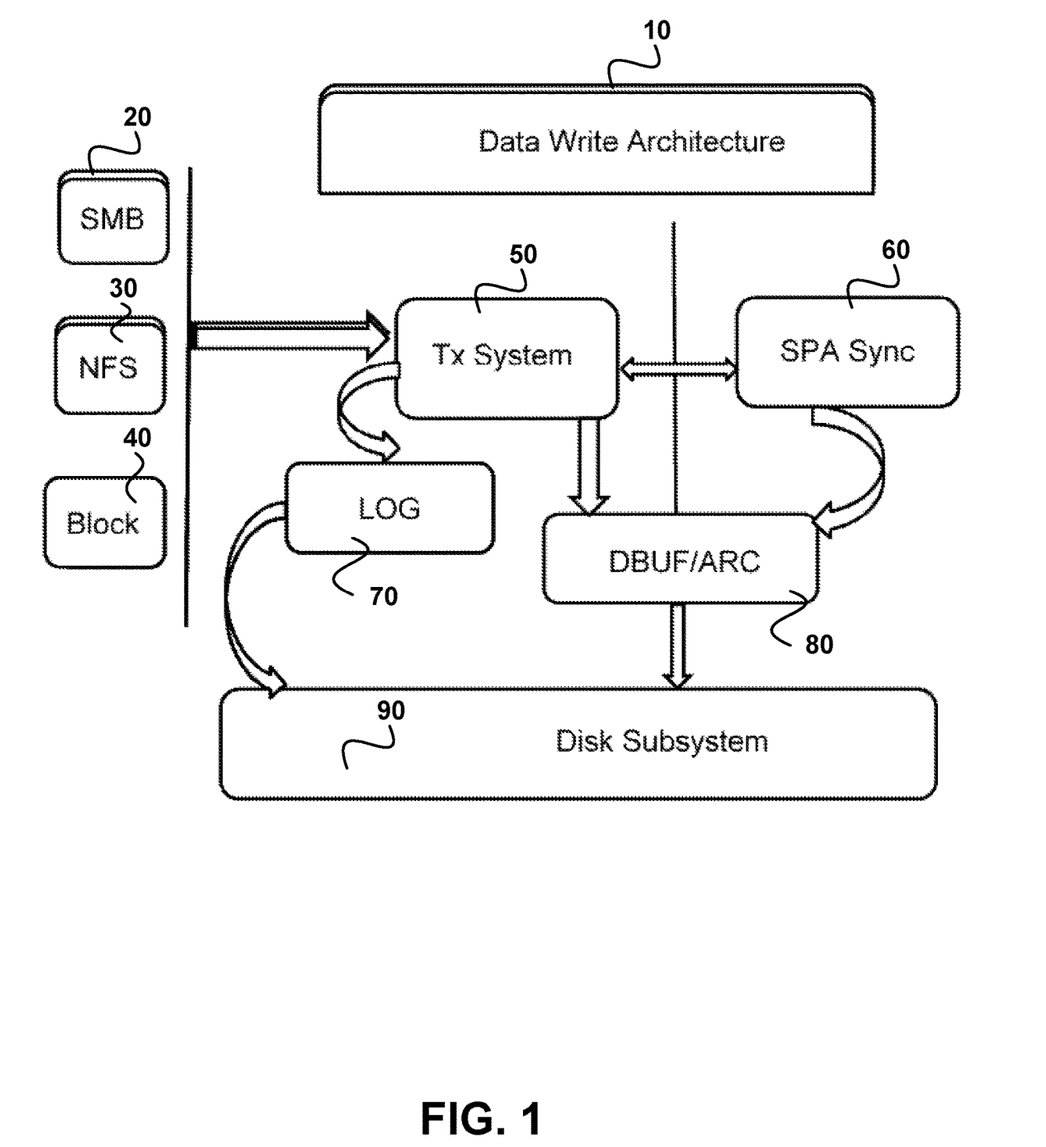
FIG. 1 depicts the disclosed file system using fast storage media for logging data required for durability for the in-flight operations according to an embodiment of the present disclosure.

FIG. 1 depicts the disclosed file system using fast storage media for logging data required for durability for the in-flight operations according to an embodiment of the present disclosure. The data write architecture 10 for the update path is shown. Data from SMB (server message block) 20 operates as an application-layer network protocol mainly used for providing shared access to files, printers, and serial ports and miscellaneous communications between nodes), NFS (network file system) 30 allows a user on a client computer to access files over a computer network much like local storage is accessed), and Blocks 40 is presented to the Tx (Transaction) System 50. The client (a desktop computer or workstation that is capable of obtaining information and applications from a server) I/O interacts with the transaction subsystem to make the changes in-memory and the transaction along with the data persisted in the log. The client I/O is acknowledged as done at this point because the data can be recovered from the log at any point of time with persisted log headers and data. The Log 70 comes from the Tx System 50 to the Disk Subsystem. The DBUF (data management buffer) and the ARC (Adaptive Replacement cache) 80 take input from the Tx System and the SPA Sync (storage pool allocator synchronize) 60 and outputs to the Disk Subsystem 90.

In some file systems the latency of the client is directly linked with the latency of being able to write the incoming writes to the log only. However, this assertion holds true if and only if the second phase of commit, spa sync, finishes in predictable time even in worst case. In reality, the unpredictable times of the spa sync phase causes the clients witnessing unpredictable latencies.

Disclosed Mechanism

The disclosed mechanism attempts to finish everything within a targeted time. A configurable default for this targeted time is set to 2.5 seconds. Therefore, the disclosed system, method and computer program product provides a predictable client latency via throttling some background file system operations and distributing others into partitioned transaction classes.

Device Capability Detection

The storage pool discovers the underlying drive capability when the pool is loaded. These capabilities are in terms of IOPS (instructions operations per second) and MBPS (megabytes per second) per drive. These are only used as a starting reference point for the capability, however.

Dynamic Adaptation of the Capabilities

An embodiment of the disclosure includes a Dynamic adjustment of capability window—From the base capabilities, at every spa sync finish time, the data rate per second and IOPS rate are re-calculated. Based on this, the local maxima is discovered by increasing the rates in increments as long as it is within the targeted time. When it crosses the target time, the capabilities are reduced in steps to meet the time. This dynamic capability window grows and shrinks the model and thus allows a discovery of the optimal steady state. The model adjusts very quickly with changed conditions.

Transaction Class

The transactions classes are created where each class gets different treatment. High priority transactions are always allowed—These are admin related, user visible or logging kind of operations which bypass the throttling while being queued in a transaction group.

Transaction Wait Class

The wait class has been created differently—passive waiters are background operations who exhaust their token for a given transaction group, and, move to the next transaction group. The active waiters additionally close the transaction group when they hit the limit so that wait time is less. The client operations are active waiters and all background operations are passive waiters.

Operation Class, Capabilities and Time Slice

The background operations and client operations have their own class. Each class gets its own set of capability in terms of IOPS/MBPS and time slices.

There are mainly the following 6 types of background operations. 1) Asynchronous Free—The big files are freed and truncated it one go but cannot be processed immediately. They are put in background and processed. 2) Scan Free—The snapshot and clone destroy. 3) Background bulk copy—There are background bulk copy operations like xcopy, file clone etc. 4) Resilvering Operations—when a failed drive is replaced, the drive in the RAID is rebuilt by this. 5) Scrub—Online filesystem integrity check. 6) Recompaction with iRAID (intelligent RAID), another class has been added in the background work.

The resources are assigned to these classes based on ratio/weight for a respective class of operation. Based on the weights, the IOPS/MBPS rates are re-computed at every spa sync time based on the capability window.

It starts with static time slices/resources as described herein. However, it keeps passing down the unspent time/resources in those buckets to the remaining processing items—so to maximize the resource utilization in real-time adjustment.

For example, let's say there is assigned IOPS resources for a client write, per a background copy in a 50:25 ratio. If there is background copy, the system will use it. However, if it is not there, the 25 part is re-assigned to writes at real time. Otherwise, at 50%, the disclosure is configured to start, not taking any further writes.

Each class of work is also tracked by the class so that every class can get its own rate mapped to underlying system capabilities and each of them can independently adapt.

Dynamic Adjustment of the Weight Per Class

In certain scenarios, background operations need to be processed faster. For example, of the free space is falling behind, async free weight is increased so that free operations can happen faster. There is a dynamic threshold detection based on a window boundaries model implemented to change the weight of the class based on a prevailing system condition.

Unspent Time Slice Lending

A critical feature for the optimizing the performance and work of the disclosed model is Lending of the Time Slice feature. The Spa Sync processing is done in stages. The class which has been processed and has not consumed the time slice, it redistributes the time slice in the remaining classes yet to be processed. The distribution is weighted among the remaining class. This provides the maximum flexibility in processing especially background operations which opportunistically consume the resources as they are available. This provides very predictable spa sync latency averaging<=2.5 seconds.

Figure 2:
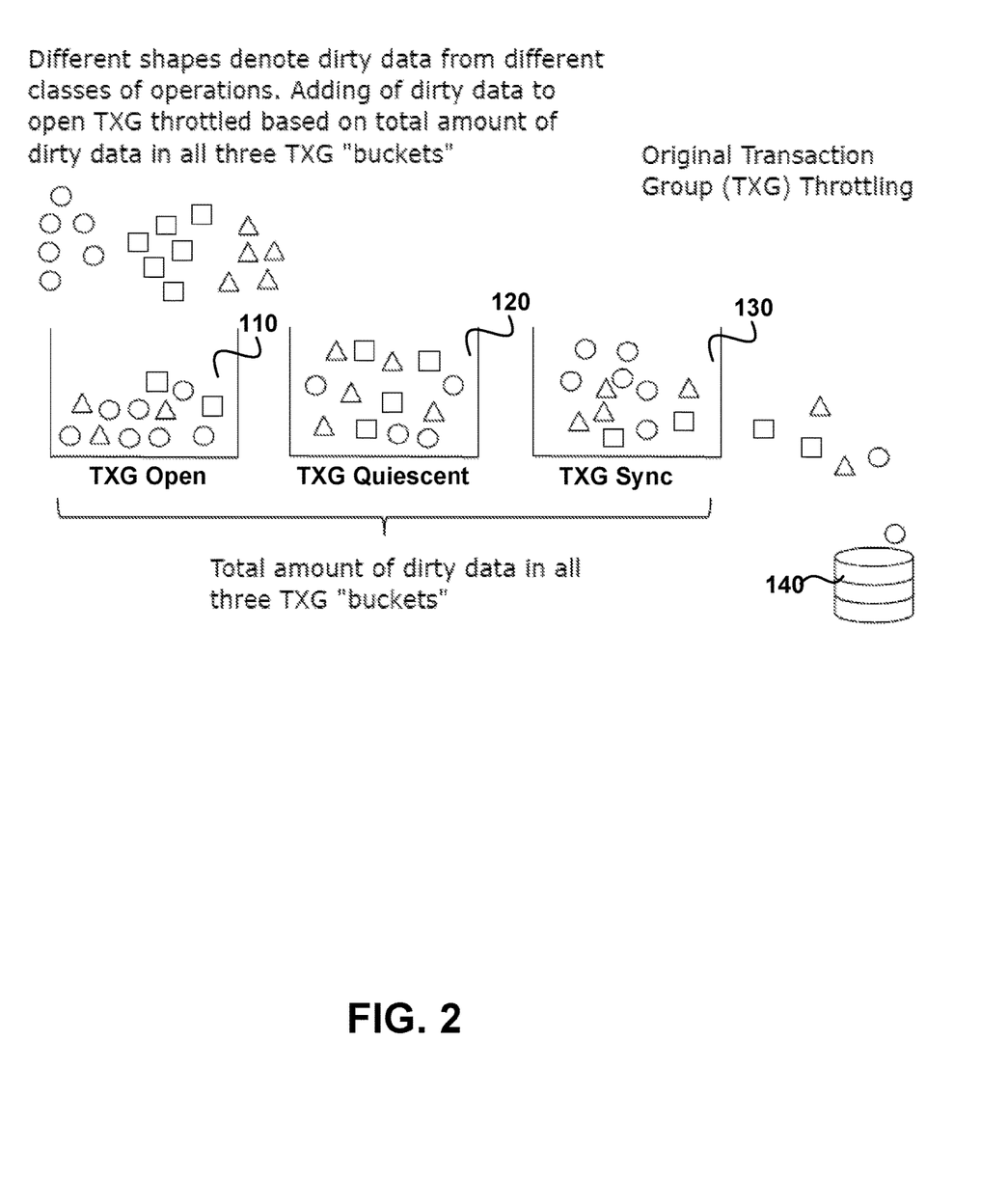
FIG. 2 is a depiction of three dirty data transaction groups receiving data from different classes of operations in accordance with an embodiment of the present disclosure.

FIG. 2 is a depiction of three dirty data transaction groups receiving data from different classes of operations in accordance with an embodiment of the present disclosure. The three dirty data transaction (TXG) groups include TXG Open 110, TXG Quiescent 120 and TXG Sync 130. Different shapes (oval, square and triangle) denote dirty data from different classes of operations. Adding of dirty data to open TXG is throttled based on a total amount of dirty data in all three 'buckets.' Data is written to the disks in the storage pool 140 from the three groups 110, 120 and 130.

Figure 3:
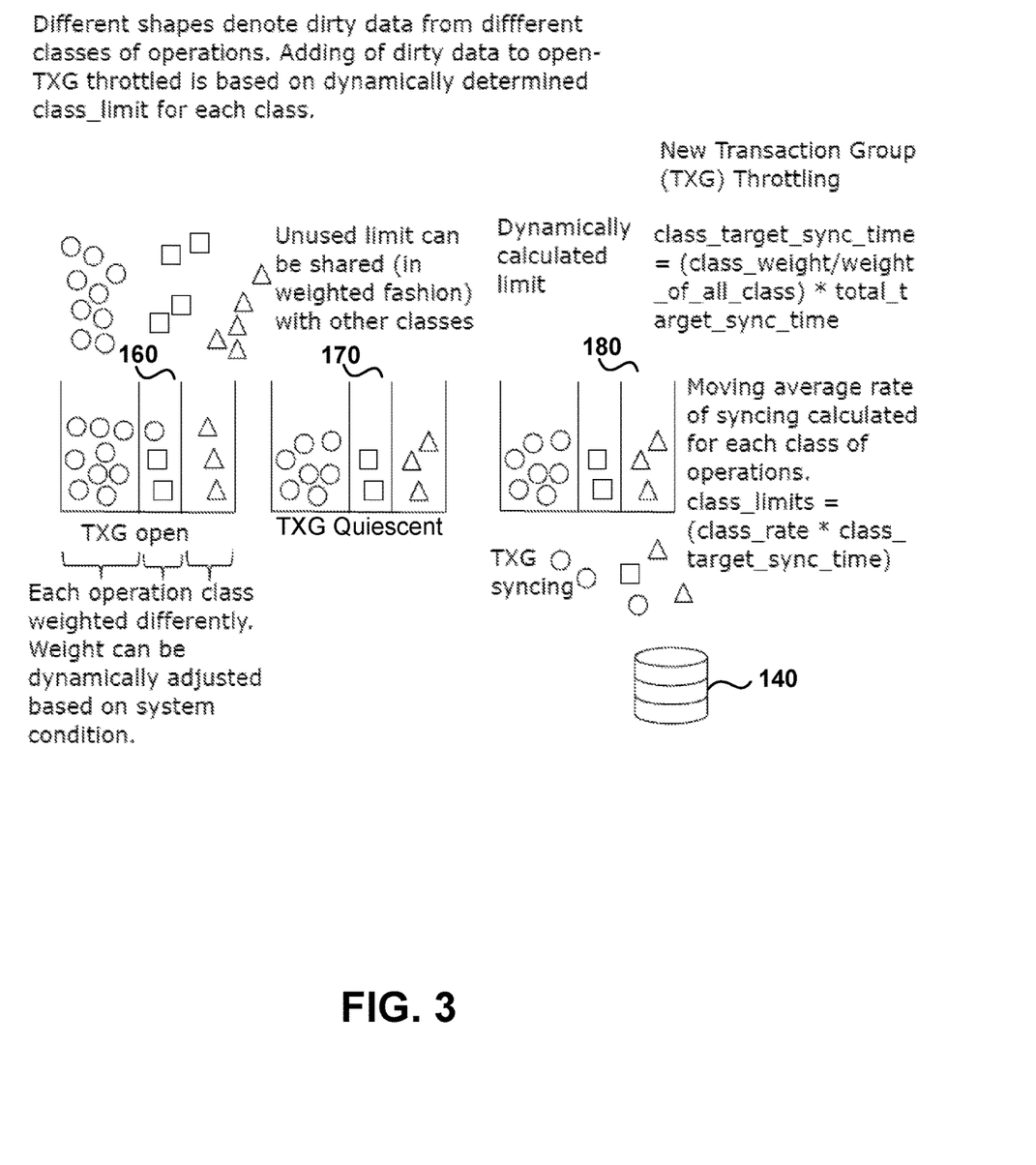
FIG. 3 is a depiction of a new transaction group throttling including dynamic weighted operation classes in accordance with an embodiment of the present disclosure.

FIG. 3 is a depiction of a new transaction group throttling including dynamic weighted operation classes in accordance with an embodiment of the present disclosure. Each of the three dirty data transaction (TXG) groups TXG Open 160, TXG Quiescent 170 and TXG Sync 180 include weighted operation classes as exemplary depicted. Class weights are dynamically adjusted based on system conditions and are weighted differently. An unused limit can be shared with other classes. Different shapes (oval, square and triangle) denote dirty data from different classes of operations. Adding of dirty data to open TXG is throttled based on total amount of dirty data in all three 'buckets.' A passive wait, a normal wait and a high priority wait are included. There is a normal wait on a hitting limit, a close current txg and send for quiesce/syn so that new text can be opened as soon as possible. A high priority is allowed to go above a limit by a certain preset percentage after which it behaves the same as a normal weight. Data is written to the disks in the storage pool 140 from the three groups 160, 170 and 180.

The dynamically calculated limit or a class_target_sync_time is equal to a class weight divided by a weight of all classes times a total target sync time. A moving average rate of syncing is calculated for each class of operations. The class_limits therefore are equal to a class_rate multiplied by a class_target_sync_time.

Figure 4:
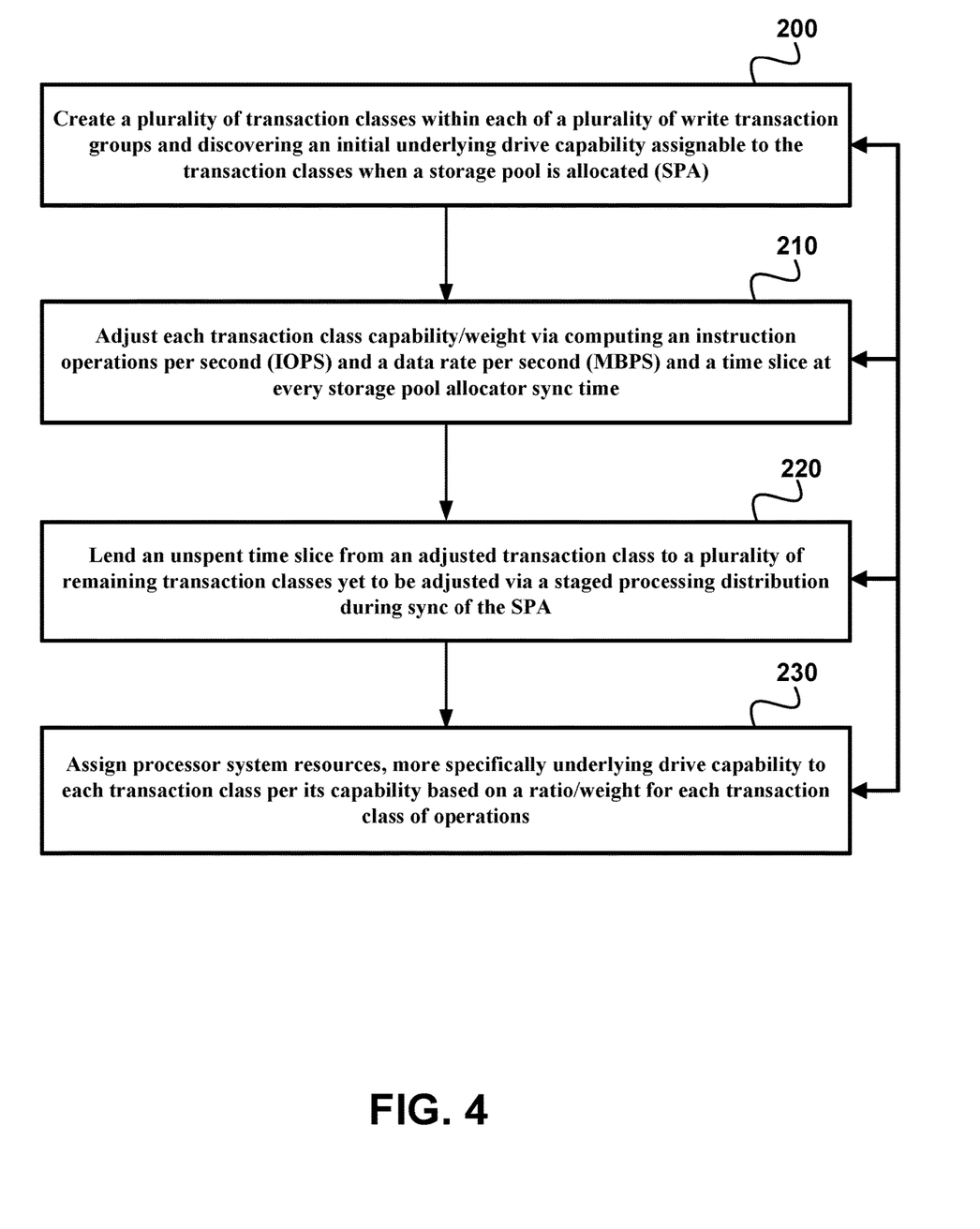
FIG. 4 is a flow chart of a method for Predictable Client Latency with Background File System Operations in accordance with an embodiment of the present disclosure.

FIG. 4 is a flow chart of a method for Predictable Client Latency with Background File System Operations in accordance with an embodiment of the present disclosure. The method for managing an amount of dirty data written from a transaction group comprises 200 creating a plurality of transaction classes within each of a plurality of write transaction groups and discovering an initial underlying drive capability assignable to the transaction classes when a storage pool is allocated (SPA). The disclosed method also includes 210 adjusting each transaction class capability/weight via computing an instruction operations per second (IOPS) and a data rate per second (MBPS) and a time slice at every storage pool allocator sync time. The disclosed method additionally includes 220 lending an unspent time slice from an adjusted transaction class to a plurality of remaining transaction classes yet to be adjusted via a staged processing distribution during sync of the SPA. The disclosed method further includes 230 assigning (time) system resources, more specifically underlying drive capability to each transaction class per its capability based on a ratio/weight for each transaction class of operations. Therefore, the disclosure allows predicting a client latency via a throttling of background file system operations.

Figure 5:
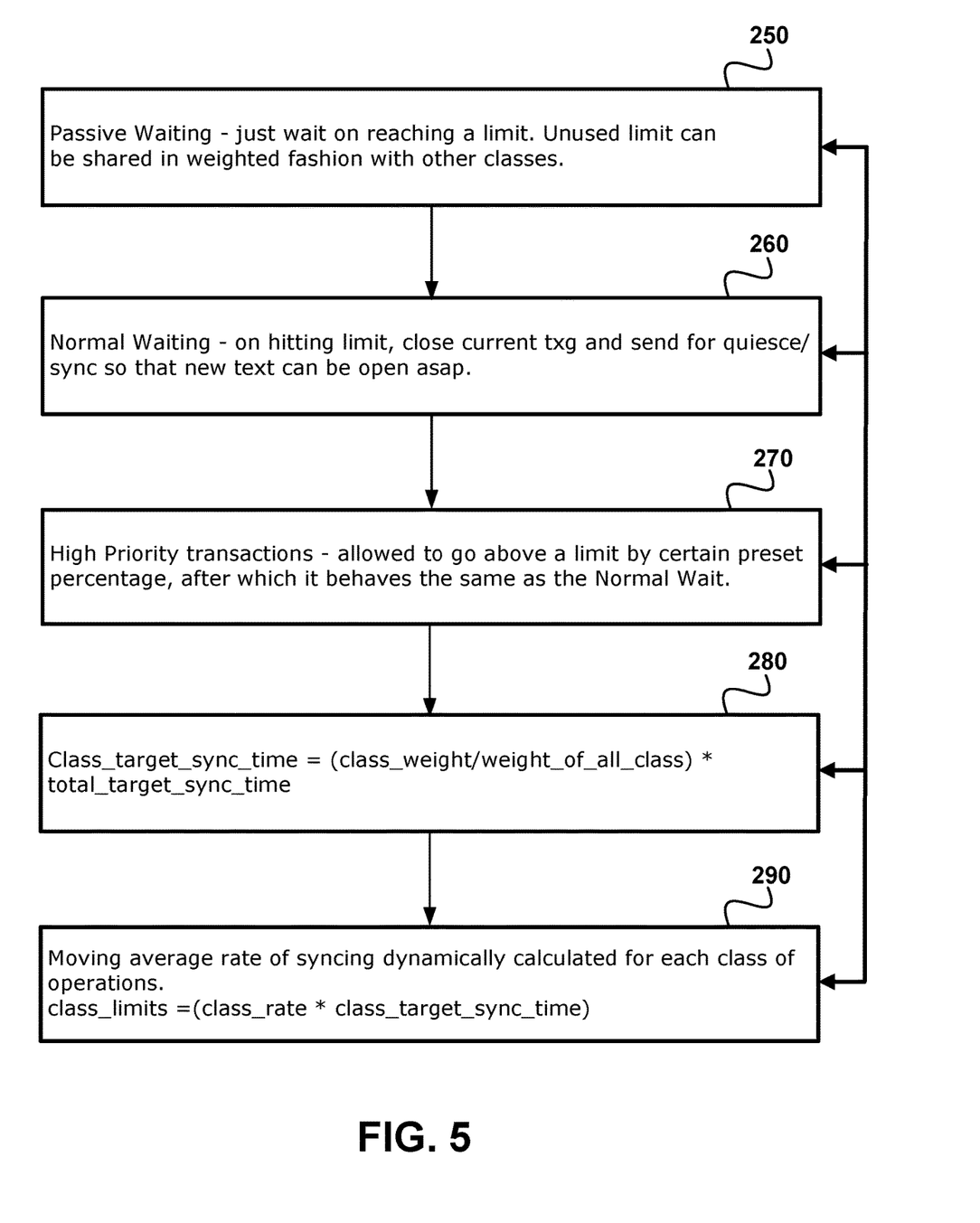
FIG. 5 is another flow chart of a method for Predictable Client Latency with Background File System Operations in accordance with an embodiment of the present disclosure.

FIG. 5 is another flow chart of a method for Predictable Client Latency with Background File System Operations in accordance with an embodiment of the present disclosure. The method includes 250 passive waiting including waiting on reaching a limit. Unused limit can be shared in weighted fashion with other classes. The method also includes 260 normal waiting on hitting a limit. The current transaction (txg) is closed and a send for quiescent sync occurs so that new text can be open as soon as possible. The method additionally includes 270 high priority transactions allowed to go above a limit by certain preset percentage, after which it behaves the same as the normal weight. The method further includes 280 determining a class target sync time equal to a class weight divided by a weight of all the classes multiplied by a total target sync time. The method yet includes 290 a moving average rate of syncing dynamically calculated for each class of operations and a class limits equal to a class rate multiplied by a class target sync time.

Figure 6:
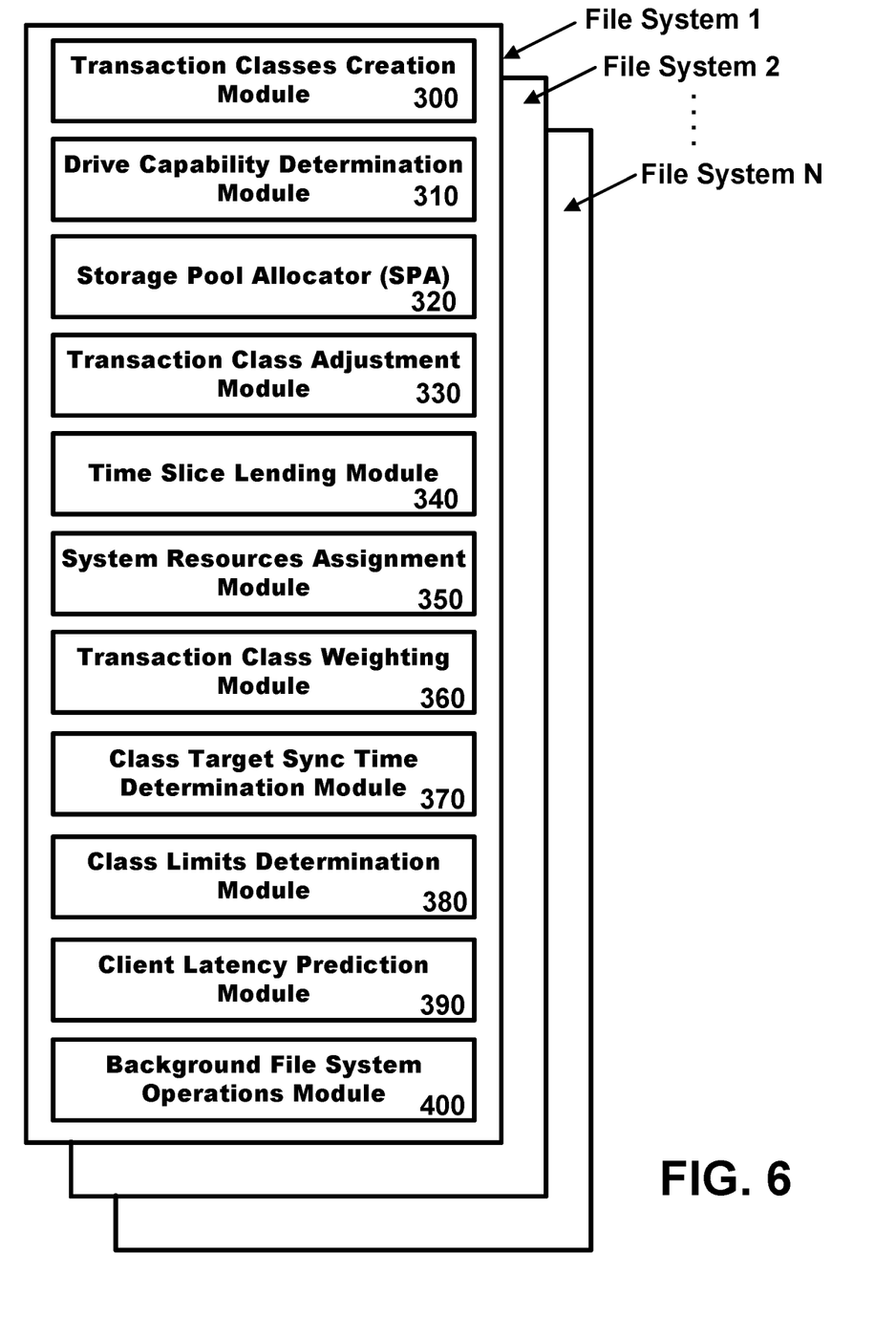
FIG. 6 is a block diagram of the Predictable Client Latency with Background File System Operations in accordance with an embodiment of the present disclosure.

FIG. 6 is a block diagram of the Predictable Client Latency with Background File System Operations in accordance with an embodiment of the present disclosure. The disclosed system includes 300 a transaction classes creation module, a 310 drive capability determination module, a 320

Storage Pool Allocator (SPA), a 330 transaction class adjustment module, a 340 time slice lending module, a 350 system resources assignment module, a 360 transaction class weighting module, a 370 class target sync time determination module, a 380 class limits determination module, a 390 client latency prediction module and a 400 background file system operations module. Multiple file system 1, 2 and up to and including n file systems may include similar and same components shared or otherwise mutually exclusive between or with other file systems.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for managing an amount of storage written from a transaction group to a set of data storage drives, the method comprising:
    a) creating a plurality of transaction classes of operations within each of a plurality of write transaction groups representing a storage pool allocator (SPA) synchronization cycle by which in-memory data is written persistently to one or more data storage drives of the set, wherein each transaction class is associated with how that respective transaction class is handled by a file system;
    b) discovering an initial drive capability for the data storage drives based on instruction operations per second (IOPS) and a data rate per second (MBPS) per data storage drive and assignable to each of the transaction classes when a storage pool is allocated via a SPA synchronization;
    c) assigning underlying drive capability to each transaction class based on a corresponding transaction class capability weight relative to the capability weights for each other transaction class;
    d) adjusting each transaction class capability weight based on the IOPS, the MBPS, and a time slice at every SPA synchronization; and
    e) lending an unspent time slice from a transaction class whose transaction class capability weight was adjusted to a plurality of remaining transaction classes whose transaction class capability weights are yet to be adjusted, via a staged processing distribution during a SPA synchronization.

2. The method for managing an amount of storage written from a transaction group of claim 1, further comprising data rate mapping and tracking each class to underlying system capabilities and adjusting each class independently.

3. The method for managing an amount of storage written from a transaction group of claim 1, further comprising finding an optimal steady state capability by growing and shrinking a transaction class capability window.

4. The method for managing an amount of storage written from a transaction group of claim 1, further comprising finding a local rate maximum via increasing a storage capability rate in increments within a targeted time and at a crossing of the target time reducing capabilities in steps to meet the target time.

5. The method for managing an amount of storage written from a transaction group of claim 1, wherein creating a plurality of transaction classes includes creating different classes for background operations and client operations each having its own respective capability in terms of IOPS, MBPS, and time slices.

6. The method for managing an amount of storage written from a transaction group of claim 1, further comprising providing a wait class of passive background operation waiters that exhaust their token for a given transaction group and move to the next transaction group.

7. The method for managing an amount of storage written from a transaction group of claim 1, further comprising providing a wait class of active waiters that close a transaction group when they hit a limit so that wait time is lessened in relation to an open transaction group.

8. The method for managing an amount of storage written from a transaction group of claim 1, further comprising determining a passive wait for reaching a limit.

9. The method for managing an amount of storage written from a transaction group of claim 1, further comprising allowing a high priority transaction wait class to go above a limit by a certain preset percentage after which the transaction wait class behaves the same as a normal transaction wait class.

10. The method for managing an amount of storage written from a transaction group of claim 1, further comprising setting a limit to a latency for a synchronization of the SPA averaging less than or equal to 2.5 seconds.

11. The method for managing an amount of storage written from a transaction group of claim 1, wherein discovering an initial underlying drive capability includes determining a plurality of starting reference points in terms of IOPS and MBPS for each underlying drive capability when a storage pool is loaded.

12. The method for managing an amount of storage written from a transaction group of claim 1, further comprising bypassing a transactions throttling for high priority transactions that are always allowed including admin related and user visible operations.

13. The method for managing an amount of storage written from a transaction group of claim 1, further comprising determining a class target sync time equal to a class weight divided by a weight of all classes multiplied by a total target sync time.

14. The method for managing an amount of storage written from a transaction group of claim 1, further comprising determining class limits equal to a class rate multiplied by a class target sync time.

15. The method for managing an amount of storage written from a transaction group of claim 1, further comprising determining a weight of an asynchronous free wait based on a diminished free space.

16. The method for managing an amount of storage written from a transaction group of claim 1, further comprising configuring background operations to opportunistically consume processing resources as they become available in response to the lending of unspent time slices.

17. A non-transitory processor-readable storage medium comprising one or more instructions which, when executed by at least one processing circuit, causes the at least one processing circuit to manage an amount of storage written from a transaction group to a set of data storage drives, by:

a) creating a plurality of transaction classes of operations within each of a plurality of write transaction groups representing a storage pool allocator (SPA) synchronization cycle by which in-memory data is written persistently to one or more data storage drives of the set, wherein each transaction class is associated with how that respective transaction class is handled by a file system;

b) discovering an initial drive capability for the data storage drives based on instruction operations per second (IOPS) and a data rate per second (MBPS) per data storage drive and assignable to each of the transaction classes when a storage pool is allocated via a SPA synchronization;

c) assigning underlying drive capability to each transaction class based on a corresponding transaction class capability weight relative to the capability weights for each other transaction class;

d) adjusting each transaction class capability weight based on the IOPS, the MBPS, and a time slice at every SPA synchronization; and e) lending an unspent time slice from a transaction class whose transaction class capability weight was adjusted to a plurality of remaining transaction classes whose transaction class capability weights are yet to be adjusted, via a staged processing distribution during a SPA synchronization of the SPA.

18. A system for managing an amount of storage written from a transaction group to a set of data storage drives, the system comprising:

a) a module configured to create a plurality of transaction classes of operations within each of a plurality of write transaction groups representing a storage pool allocator (SPA) synchronization cycle by which in-memory data is written persistently to one or more data storage drives of the set, wherein each transaction class is associated with how that respective transaction class is handled by a file system, and configured to discover an initial drive capability for the data storage drives based on instruction operations per second (IOPS) and a data rate per second (MBPS) per data storage drive and assignable to each of the transaction classes when a storage pool is allocated via a SPA synchronization;

b) a module configured to assign underlying drive capability to each transaction class based on a corresponding transaction class capability weight relative to the capability weights for each other transaction class;

c) a module configured to adjust each transaction class capability weight based on the IOPS, the MBPS, and a time slice at every SPA synchronization; and d) a module configured to lend an unspent time slice from a transaction class whose transaction class capability weight was adjusted to a plurality of remaining transaction classes whose transaction class capability weights are yet to be adjusted, via a staged processing distribution during a SPA synchronization.

19. The system for managing an amount of storage written from a transaction group of claim 18, further comprising a module configured to predict a client latency via a throttling of a plurality of background file system operations.

* * * * *